United States Patent [19]

Stacy et al.

[11] 4,439,014
[45] Mar. 27, 1984

[54] LOW VOLTAGE ELECTRO-OPTIC MODULATOR

[75] Inventors: Robert A. Stacy, St. Louis County; Robert R. Rice, Florissant, both of Mo.

[73] Assignee: McDonnell Douglas Corporation, Long Beach, Calif.

[21] Appl. No.: 321,065

[22] Filed: Nov. 13, 1981

[51] Int. Cl.³ .............................................. G02F 1/03
[52] U.S. Cl. ..................................... 350/388; 350/389; 350/405
[58] Field of Search ...................... 350/377, 387–389, 350/403, 405

[56] References Cited

U.S. PATENT DOCUMENTS

| | | | |
|---|---|---|---|
| 3,429,636 | 2/1969 | Wentz | 350/388 |
| 3,495,892 | 2/1970 | Dailey | 350/389 |
| 3,532,890 | 10/1970 | Denton | 250/199 |
| 3,638,024 | 1/1972 | Chen et al. | 250/199 |
| 3,684,350 | 8/1972 | Wentz | 350/388 |
| 3,956,626 | 5/1976 | Ross | 250/199 |
| 4,145,607 | 3/1979 | Bates | 250/199 |

*Primary Examiner*—William H. Punter
*Attorney, Agent, or Firm*—Gregory A. Cone; George W. Finch; Donald L. Royer

[57] ABSTRACT

The low voltage operation of this electro-optic modulator is realized by a unique system configuration in which the input light beam is first separated into two linearly polarized components of equal intensity, the beams are then focused into two crystals where the beams propagate as pure E waves, the crystals are electrically modulated and the output beams from each crystal are then recombined and recollimated. The low voltage operation is rendered possible by the fact that there is no cancellation between the E and O components as in conventional modulation systems of this type since both beams are transmitted as pure E waves during the modulation process.

9 Claims, 3 Drawing Figures

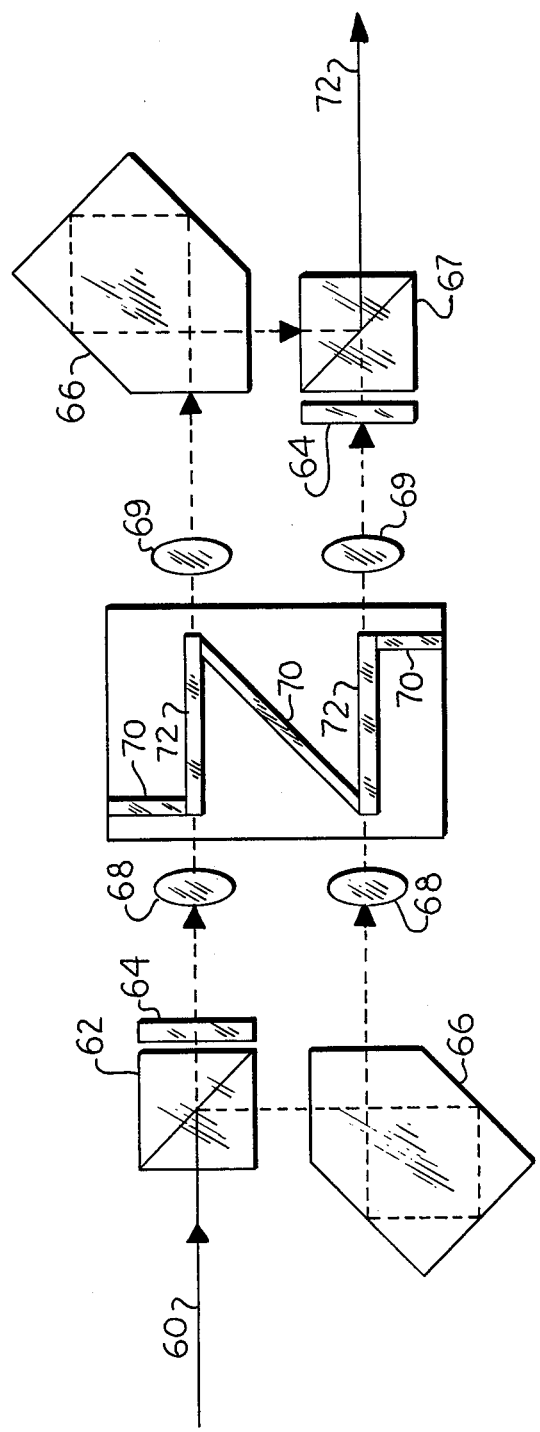

LOW VOLTAGE ELECTRO-OPTIC MODULATOR

BACKGROUND OF THE INVENTION

1. Field of the Invention

This invention relates to electro-optic modulation systems. Still more particularly, this invention relates to low voltage laser modulators using two crystals.

2. Description of the Prior Art

The system of this invention was intially developed in the context of laser-based space communication systems. In such systems, it is necessary to obtain maximum performance, that is, high data rate, with minimal power consumption. Minimizing the power consumption of the system has several beneficial effects: power supply requirements are reduced; heat dissipation problems are reduced; and the reliability-lifetime of the system will be increased due to the lower switching voltages utilized.

Modulation systems based on the electro-optic polarization of light beams have been in existence for many years. Most of these systems are based on the Kerr effect in which electrically induced birefringence in either a liquid or a crystal, proportional to the applied field squared, causes a rotation of the plane of polarization of the light beam upon application of a suitable electric field. Devices which employ two capacitor plates inserted in a glass cell containing a suitable liquid are called Kerr cells. When a similar effect, proportional to the applied field, is induced in suitable crystals, the device is usually called a Pockels cell. The crystal or Pockels cell is the more commonly employed device. Such devices have been employed in a variety of different configurations to modulate light beams.

U.S. Pat. No. 3,956,626 to Ross discloses a "Pulse Quaternary Communication Means" directed to a high data rate laser communication system. Although bearing a superficial similarity in its structural organization to the instant invention, this prior art system in fact utilizes its various crystal modulators to perform four different operations on each laser pulse by manipulating both the polarizaton and the delay between pulses.

A more conventional use of the crystal modulators is found in U.S. Pat. No. 3,532,890 to Denton for "Optical Multiplexing And Demultiplexing Systems." This system multiplexes and demultiplexes by the use of a polarization switch which rotates the polarization of selected pulses 90° for each shift and a polarization-selective coupler which combines the two separate orthogonally-directed pulse trains along a common beam direction. The polarization selective coupler also functions as a channel separator, thereby demultiplexing orthogonally polarized signals for propagation along two separate wave paths. This demonstrates a conventional use of the crystal modulators and, further, that the inputs to and the outputs from the individual crystal modulators do not bear a one-to-one correspondence with each other.

Other prior art of interest includes U.S. Pat. No. 3,638,024 to Chen, et al., for a "Optical Pulse Inverval Modulation System" and U.S. Pat. No. 4,145,607 to Bates for a "System And Method For Shaping Pulses Of Optical Radiation." None of these prior art systems disclose the system of the instant invention wherein crystals are utilized to transmit essentially all of the input light beam as essentially pure E component linearly polarized light, thus not requiring the additional voltage for modulation of the input light beam which is required when both E and O polarization components are modulated simultaneously.

SUMMARY OF THE INVENTION

The system of this invention comprises an electro-optic modulator which comprises a means for delivering a collimated beam of coherent light to the input of the modulator; a means for splitting the input beam into two intermediate beams, wherein a first intermediate beam is linearly polarized in a first direction and a second intermediate beam is polarized in a second direction which is perpendicular to the first direction, comprising an input prism; a first Pockels cell wherein the most efficient electro-optical axis of the cell is oriented parallel to the polarization vector of the first intermediate beam which is transmitted through the cell; a second Pockels cell wherein the most efficient electro-optical axis of the cell is also oriented parallel to the polarization vector of the second intermediate beam which is transmitted through the cell; a modulation means comprising a voltage source controlled in relation to a modulating signal wherein the two cells are electrically connected between the voltage source and ground such that the electrical connections to the crystal faces produce an electro-optical phase shift for each cell that is opposite in sign; means for recombining the two intermediate beams into an output beam, comprising an output prism, and an output recollimation means.

DETAILED DESCRIPTION OF THE INVENTION

The system of this invention is a two-crystal electro-optic modulator using components of a conventional Pockels cell but configured so as to efficiently utilize the electro-optic effect of each of the two cells. Using LiTaO$_3$ crystals as the modulating medium for the Pockels effect, the two crystal modulator has been shown to have a full modulation switching voltage that is approximately one third of that required for a conventional Pockels cell configuration. As mentioned above, this greatly reduced power requirement has substantial advantages when compared to prior art modulation systems for almost all applications.

Figure 1:
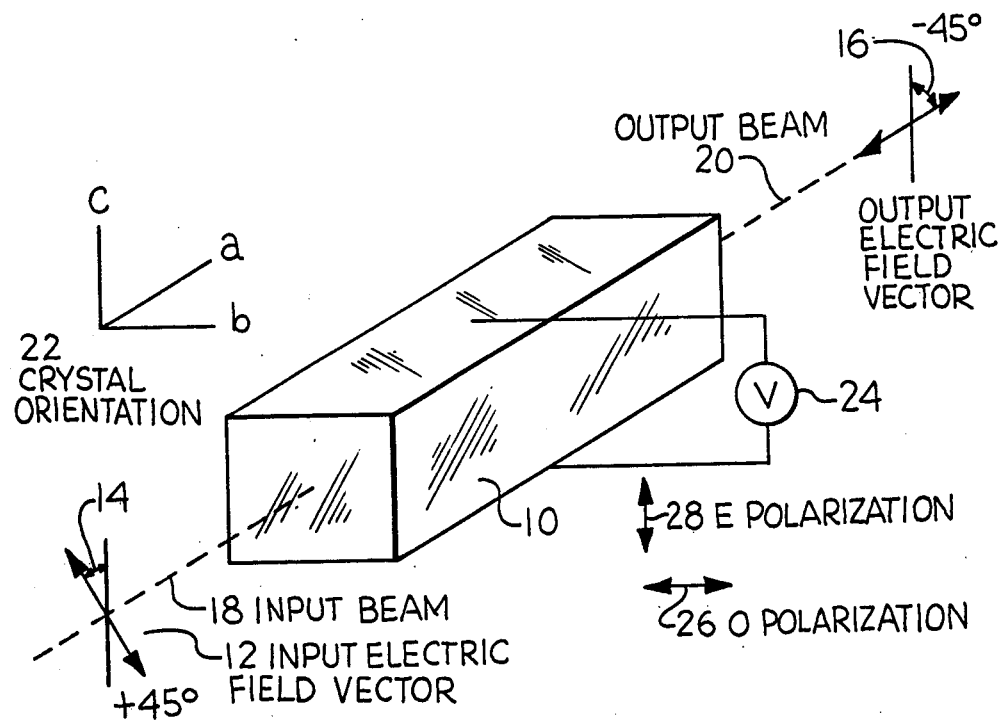
FIG. 1 is an isometric sketch showing a conventional Pockels cell.

FIG. 1 shows a conventional Pockels cell. The input laser beam 18 is polarized at an angle 14, here 45° to the C axis of the LiTaO$_3$ crystal. The crystal here has the three crystal axes 22 as shown in FIG. 1 with axis C being hereinafter referred to as the optical axis of the crystal. The crystal then resolves this 45° input beam into an ordinary (O) component 26 with O being perpendicular to the C axis and an extraordinary (E) component 28 with E being parallel to the C axis of the crystal such that both the E and O components are of equal amplitude. Upon emerging from the crystal 10, the O and E components recombine to reproduce some output polarization state of the output beam 20, depending upon the net retardation, Γ, which is the difference in phase shift between the two components, E and O. If Γ is equal to some even number of half waves (nπ/radians) the output polarization is linear and parallel to the input; but, if $\Gamma$ is equal to an odd number of half waves, the sign of one component is reversed and the output polarization is linear and perpendicular to the input polarization direction. This case is illustrated in FIG. 1 with the output electrical field vector being oriented at $-45°$ relative to the C axis of the crystal and the input electrical field vector of the beam being oriented at $+45°$ to the C axis of the crystal. The transmission of a conventional modulator between crossed polarizers is:

$$I_t = I_o \sin^2(\Gamma/2) \quad (1)$$

The electric field applied along the C axis of the crystal changes the refractive index for both the O and E components by unequal amounts as given by:

$$\Delta n_e = -\frac{1}{2} n_e^3 r_{33} \frac{V}{d} \text{ and } \Delta n_o = -\frac{1}{2} n_o^3 r_{13} \frac{V}{d} \quad (2)$$

Where $n_e$ and $n_o$ are the extraordinary and ordinary refractive indices, $r_{33}$ and $r_{13}$ are the electro-optic coefficients, V is the applied voltage, and d is the crystal thickness. The relative induced phase shift between the E and O components is therefore given by:

$$\Delta \Gamma = \frac{\pi}{\lambda_o} [n_e^3 r_{33} - n_o^3 r_{13}] V \left(\frac{l}{d}\right) \quad (3)$$

The voltage required to induce a $\pi$ radian retardation, and thereby switch output polarization of the modulator, is given by:

$$V_s = \left(\frac{d}{l}\right) \frac{\lambda_o}{n_e^3 r_{33} - n_o^3 r_{13}} \quad (4)$$

The significant fact to notice is that the net retardation is the difference between the phase shift induced for the O and for the E components, wherein the corresponding phase shifts are in the same sense. This accounts for the partial cancellation of the electro-optic effect as described by the subtraction term in equations (3) and (4). There is not a total cancellation, however, since the $n_e^3 r_{33}$ term is about three times larger than the $n_o^3 r_{13}$ term.

Figure 2:
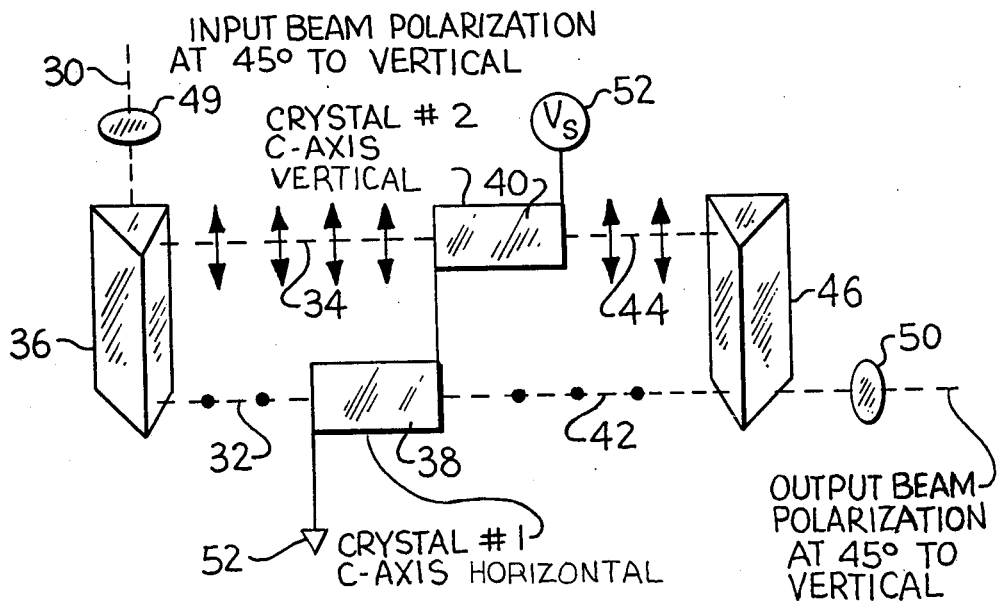
FIG. 2 is a sketch diagram of the physical organization of the system of this invention employing two Pockels cell modulators; and, FIG. 3 is a sketch diagram of an operating embodiment of the system of this invention.

The two-crystal modulator system of this invention achieves an approximately three-fold reduction in switching voltage by using two separate crystals in a configuration that uses the full electro-optic effect for the E polarization alone in both crystals. A diagram of the physical layout of this system is shown schematically in FIG. 2. The input beam 30 is resolved into two linearly polarized components of equal intensity 32 and 34 by a beam splitting polarization prism 36. The beams are focused into the two crystals by a means shown here as a single input lens 49 before the prism 36. These beams 32 and 34 then enter the two crystal modulators 38 and 40 where both beams propagate as pure E waves. The output beams 42 and 44 are then recombined by an ouput prism 46 which is substantially identical to the input prism 36. The output from the output prism is then recollimated by an output lens 50. The two crystals may be incorporated into traveling wave structures as a means to maximize wide band operation when connected as shown in the figure. However, such a construction is not necessary for low voltage operation.

The modulation of the crystals is accomplished by impressing an effective voltage, $V_s$, 52 across the crystal faces of each crystal which are perpendicular to the C optical axes of the respective crystals. The voltage is applied in opposite senses to the two crystals with respect to the positive C axis such that the phase shifts are in opposite directions. This can be accomplished by orienting the two crystals so the positive directions of the C axis are opposite. The phase shifts $V_v$ and $V_h$ induced in the vertically and horizontally polarized arms are given by:

$$\phi_v = \frac{\pi}{\lambda_o} n_e^3 r_{33} \left(\frac{l}{d}\right) V; \phi_h = -\frac{\pi}{\lambda_o} n_e^3 r_{33} \left(\frac{l}{d}\right) V \quad (5)$$

The effective retardation $\Gamma'$ is the difference and is therefore:

$$\Gamma' = \frac{2\pi}{\lambda} n_e^3 r_{33} \left(\frac{l}{d}\right) V \quad (6)$$

The voltage required to induce a retardation of $\pi$ radians and therefore switch the output polarization is:

$$V'_s = \left(\frac{d}{l}\right) \frac{\lambda_o}{2 n_e^3 r_{33}} \quad (7)$$

The equation (7) immediately above should be compared to the previous equation (4) to note that there is no cancellation of the electro-optic effect for the two-crystal system of this invention. As a result, a comparison of the switching voltages between the conventional Pockels cell and the two-crystal system of this invention indicates that the degree of improvement achieved by the two-crystal configuration is:

$$\frac{V'_s}{V_s} = \frac{n_e^3 r_{33} - n_o^3 r_{13}}{2 n_e^3 r_{33}} \geq \frac{1}{3} \quad (8)$$

An existing one gigabit-per-second modulator system employing the conventional Pockels cell approach in use in the laboratories of the assignee of this invention requires approxiately 20 volts to switch. Therefore, the expected switching voltage of a two crystal modulator using crystals of identical size should be less than 7 volts. This results in a prime power reduction of about an order of magnitude.

An experimental demonstration has been made of the system of this invention using two LiTaO$_3$ modulator crystals. The crystals are 0.2 millimeters by 0.2 millimeters by 10 millimeters long and are mounted in ceramic substrates. The light of a HeNe laser was used for the input light beam. An audio amplifier operating at 1 kiloHertz with a 60 volt maximum peak-to-peak voltage was used to drive the crystals for the experiment.

Theoretically, the modulator crystals used in the experiment, when treated as individual Pockels cells, should have full switching voltages of 57 volts when operated in a conventional manner. In actuality, the full switching voltage for each crystal was 52 volts for crystal no. 1 and 56 volts for crystal no. 2. Using published data for the index of refraction of LiTaO$_3$ at the 0.633 micrometer wavelength of the HeNe laser and for the electro-optic coefficients (low frequency—1 kiloHertz), one finds the ratio for equation (8) to be equal to:

$$\frac{n_e^3 r_{33} - n_o^3 r_{13}}{2n_e^3 r_{33}} = 0.39 \quad (9)$$

Therefore, since the switching of the two-crystal modulator of this invention is additive, one would expect the full switching voltage to be 39% of the average of the two crystals if they were operated separately or:

$$V_s = 0.39 \cdot \tfrac{1}{2}(V_1 + V_2) = 21.1 \text{ volts} \quad (10)$$

The experimental value for the full switching of the two-crystal modulator at 1 KiloHertz was 21 volts. This was in excellent agreement with the predicted theoretical value.

An operational low voltage laser modulator system was then constructed along the lines shown in FIG. 3. This also was built as a traveling-wave structure to demonstrate the feasibility of ultra-high speed binary polarization modulation. This particular operating embodiment was modified slightly to facilitate fabrication and optical alignment when compared to the diagram shown in FIG. 2. The two modulator crystals 72 were bonded to a substrate and connected to a microstrip 70 to form the electrical transmission line. The input optical beam 60 was split into two equal intensity components by the polarization beam splitter 62. The half wave plate (λ/2 plate) 64 rotates the polarization of the light in the upper leg of the optical transmission path by 90° such that the laser light travels as pure E waves in both crystals. The optical time delay 66 provides proper timing of the optical signal and electrical wave form at the lower crystal. The timing at the upper crystal can be adjusted electrically. The light along each leg is then focused into the appropriate crystal by action of the respective lenses 68. The output beams from the crystals are then transmitted through the respective lenses 69. In the upper leg the beam then travels through another optical delay device 66 and then enters the polarization beam combiner 67. The output in the lower leg after transmission through the output lens 69 enters another half wave plate 64 and then into the polarization beam combiner 67 where it combines with the output beam from the upper leg to form the modulated output beam 72.

For this particular operating prototype, the crystal ends have been anit-reflection coated. However, the use of a Brewster cut on the crystal faces is also possible and would entail only a mechanical redesign of the modulator.

This particular prototype was electrically driven by a two-gigabit-per-second (Gbps) psuedo-noise (PN) source. The modulated optical signal was passed through another polarization beam splitter and detected using a high speed silicon avalanche photo diode. The results of the operation of this modulator demonstrated that effective ultra high speed optical modulation was obtainable through the use of this invention.

We claim:

1. An electro-optic modulator comprising:
    means for delivering a coherent light beam to the input of the modulator;
    means for splitting the input beam into two intermediate beams of substantially equal intensity, wherein a first intermediate beam has a linear polarization defined by a first vector, and a second intermediate beam has a linear polarization defined by a second vector which is substantially perpendicular to the first vector;
    a first Pockels cell having A, B, and C crystal axes wherein the C axis of the cell is oriented parallel to the first polarization vector of the first intermediate beam which is transmitted through the cell as an E-wave;
    a second Pockels cell having A, B, and C crystal axis wherein the C axis of the cell is oriented parallel to the second polarization vector of the second intermediate beam which is transmitted through the second cell as an E-wave;
    a modulation means comprising a voltage source controlled in relation to a modulating signal such that the voltage source is operably connected across the crystal faces of each cell perpendicular to the C axis of each cell;
    means for recombining the two intermediate beams into an output beam.

2. The modulator of claim 1 wherein the means for splitting the input beam into two intermediate beams and the means for recombining the two intermediate beams into an output beam comprise polarization beam splitters.

3. The modulator of claim 1 wherein the voltage source is connected such that the two cells are connected in series between the voltage source and ground with the C axis of the two cells being oriented opposite each other relative to the voltage.

4. The modulator of claim 1 wherein the input and output beams are collimated.

5. An electro-optic modulator comprising:
    means for presenting a light beam to an input of the modulator;
    means for splitting by polarizing beamsplitter means the input beam into two intermediate beams of substantially equal intensity, including two Pockels cell means, each disposed across a respective intermediate beam, electrically modulated perpendicular to the C crystal axes of the cells such that the respective intermediate beams are simultaneously retarded but in opposite senses;
    means for recombining the modulated intermediate beams such that one of the beams is rotated approximately 90° relative to the other such that the beams are additively combined into an output beam.

6. The modulator of claim 5 wherein the input light beam is substantially coherent and monochromatic.

7. The modulator of claim 5 wherein the Pockels cells comprise substantially functionally identical LiTaO$_3$ crystals.

8. The modulator of claim 7 wherein the C crystal axis of an individual crystal is oriented substantially perpendicular to the axis of its respective intermediate beam.

9. The modulator of claim 1 wherein the first and second Pockels cells comprise substantially functionally identical LiTaO$_3$ crystals.

* * * * *